United States Patent
Feuerstack et al.

(10) Patent No.: US 9,112,359 B2
(45) Date of Patent: Aug. 18, 2015

(54) SYSTEM FOR CHARGING AN ENERGY STORE, AND METHOD FOR OPERATING THE CHARGING SYSTEM

(75) Inventors: Peter Feuerstack, Ludwigsburg (DE); Erik Weissenborn, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 330 days.

(21) Appl. No.: 13/825,174

(22) PCT Filed: Aug. 25, 2011

(86) PCT No.: PCT/EP2011/064616
§ 371 (c)(1),
(2), (4) Date: Jun. 6, 2013

(87) PCT Pub. No.: WO2012/038184
PCT Pub. Date: Mar. 29, 2012

(65) Prior Publication Data
US 2013/0270905 A1    Oct. 17, 2013

(30) Foreign Application Priority Data
Sep. 20, 2010   (DE) .......................... 10 2010 041 068

(51) Int. Cl.
*H02J 7/00* (2006.01)
*B60L 11/18* (2006.01)
(Continued)

(52) U.S. Cl.
CPC .......... *H02J 7/0013* (2013.01); *B60L 11/1853* (2013.01); *B60L 11/1864* (2013.01); *B60L 11/1866* (2013.01); *H02J 7/0024* (2013.01); *H02J 7/0055* (2013.01); *H02J 7/1492* (2013.01); *H02P 27/14* (2013.01);
(Continued)

(58) Field of Classification Search
USPC ..................................................... 307/66, 18
See application file for complete search history.

(56) References Cited

U.S. PATENT DOCUMENTS 5,960,898 A * 10/1999 Okada et al. ................. 180/65.8
6,130,492 A   10/2000 Satake et al.
(Continued)

FOREIGN PATENT DOCUMENTS

CN         1222781 A     7/1999
CN       201207620 Y     3/2009
(Continued)

OTHER PUBLICATIONS

International Search Report, PCT International Application No. PCT/EP2011/064616, dated Aug. 8, 2012.

*Primary Examiner* — Rexford Barnie
*Assistant Examiner* — Daniel Kessie
(74) *Attorney, Agent, or Firm* — Kenyon & Kenyon LLP

(57) ABSTRACT

A system for charging at least one energy reservoir cell in a controllable energy reservoir which serves to control and supply electrical energy to an n-phase electrical machine where n≥1. The controllable energy reservoir has n parallel energy supply branches that each have at least two energy reservoir modules, connected in series, that each encompass at least one electrical energy reservoir cell having an associated controllable coupling unit, and are connected to a reference bus and to a respective phase of the electrical machine. As a function of control signals, the coupling units interrupt the respective energy supply branch, bypass the respectively associated energy reservoir cells, or switch the respectively associated energy reservoir cells into the respective energy supply branch.

9 Claims, 6 Drawing Sheets

(51) Int. Cl.
*H02J 7/14* (2006.01)
*H02P 27/14* (2006.01)

(52) U.S. Cl.
CPC . *H02J 2007/0059* (2013.01); *H02J 2007/0067* (2013.01); *Y02E 10/766* (2013.01); *Y02T 10/642* (2013.01); *Y02T 10/7005* (2013.01); *Y02T 10/7055* (2013.01); *Y02T 10/7061* (2013.01); *Y02T 10/92* (2013.01)

(56) References Cited

U.S. PATENT DOCUMENTS

| | | | |
|---|---|---|---|
| 5,642,275 A1 | 10/2005 | Welchko et al. | |
| 7,977,812 B2* | 7/2011 | Senda | 307/10.1 |
| 2003/0029654 A1* | 2/2003 | Shimane et al. | 180/65.4 |
| 2005/0231152 A1 | 10/2005 | Welchko et al. | |
| 2006/0164028 A1 | 7/2006 | Welchko et al. | |
| 2007/0024227 A1* | 2/2007 | Kunkel et al. | 318/479 |
| 2009/0127029 A1* | 5/2009 | Oesterle et al. | 187/290 |
| 2011/0073392 A1* | 3/2011 | Collins et al. | 180/65.22 |
| 2011/0115290 A1* | 5/2011 | Tanabe et al. | 307/10.1 |
| 2011/0187184 A1* | 8/2011 | Ichikawa | 307/10.1 |
| 2012/0019174 A1* | 1/2012 | Mahlein et al. | 318/139 |
| 2012/0123625 A1* | 5/2012 | Ueo et al. | 701/22 |
| 2012/0299377 A1* | 11/2012 | Masuda et al. | 307/10.1 |
| 2013/0193751 A1* | 8/2013 | Sugiyama et al. | 307/9.1 |

FOREIGN PATENT DOCUMENTS

| | | |
|---|---|---|
| DE | 101 03 031 | 7/2002 |
| DE | 10 2010 027 857 | 10/2011 |
| DE | 10 2010 027 861 | 10/2011 |
| EP | 0907238 A1 | 4/1999 |
| WO | WO 02/063758 | 8/2002 |

* cited by examiner

SYSTEM FOR CHARGING AN ENERGY STORE, AND METHOD FOR OPERATING THE CHARGING SYSTEM

FIELD

The present invention relates to a system for charging an energy reservoir, and to methods for operating the charging system.

BACKGROUND INFORMATION

It is becoming apparent that in the future, both for stationary applications such as wind power installations and in vehicles such as hybrid or electric vehicles, increasing use will be made of electronic systems that combine new energy storage technologies with electrical drive technology. In conventional applications, an electrical machine, which is embodied, e.g., as a phase-sequence machine, is controlled via a converter in the form of an inverter. A characteristic of such systems is a so-called DC link circuit through which an energy reservoir, usually a battery, is connected to the DC voltage side of the inverter. In order to be able to meet the demands of a particular application in terms of power output and energy, multiple battery cells are connected in series. Because the current furnished by an energy reservoir of this kind must flow through all the battery cells, and because a battery cell can conduct only a limited current, battery cells are often additionally connected in parallel in order to increase the maximum current.

A series circuit of multiple battery cells yields not only a high total voltage but also the problem that the entire energy reservoir fails if a single battery cell fails, since battery current can then no longer flow. Such a failure of the energy reservoir can result in failure of the entire system. In a vehicle, a failure of the drive battery can leave the vehicle "stranded." In other applications, for example rotor blade adjustment of wind power installations, unfavorable boundary conditions such as, for example, high wind can in fact lead to hazardous situations. A high level of reliability of the energy reservoir is therefore always desirable, "reliability" referring to the ability of a system to operate in fault-free fashion for a predetermined time.

German Patent Application Nos. DE 10 2010 027857 and DE 10 2010 027861 describe batteries having multiple battery module sections that are connectable directly to an electrical machine. The battery module sections have a plurality of battery modules connected in series, each battery module having at least one battery cell and an associated controllable coupling unit that makes it possible, as a function of control signals, to interrupt the respective battery module section or bypass the respectively associated at least one battery cell or switch the respectively associated at least one battery cell into the respective battery module section. By appropriate application of control to the coupling units, e.g. with the aid of pulse width modulation, it is also possible to furnish suitable phase signals in order to control the electrical machine, so that a separate pulse width modulated inverter can be omitted. The pulse width modulated inverter required in order to control the electrical machine is thus, so to speak, integrated into the battery. German Patent Application Nos. DE 10 2010 027857 and DE 10 2010 027861 are expressly incorporated herein by reference in their entirety.

SUMMARY

In accordance with the present invention, an example system is provided for charging at least one energy reservoir cell in a controllable energy reservoir which serves to control and supply electrical energy to an n-phase electrical machine where $n \geq 1$. The controllable energy reservoir has n parallel energy supply branches that each have at least two energy reservoir modules, connected in series, that each encompass at least one electrical energy reservoir cell having an associated controllable coupling unit. The energy supply branches are connectable on the one hand to a reference potential—hereinafter referred to as a "reference bus"—and on the other hand to a respective phase of the electrical machine. As a function of control signals, the coupling units either interrupt the respective energy supply branch or bypass the respectively associated energy reservoir cells or switch the respectively associated energy reservoir cells into the energy supply branch. The energy supply branches of the controllable energy reservoir and the phases of the electrical machine are connectable via a controllable n-phase bidirectional rectifier unit to a DC voltage link circuit. The reference bus of the controllable energy reservoir is connectable to a reference bus of the DC voltage link circuit. In order to enable the charging of at least one of the energy reservoir cells, the DC link circuit is electrically connectable to a charging device.

In accordance with the present invention, an example method is provided for operating an example charging system according to the present invention in which a charging device is connected to the DC voltage link circuit, for the case in which a voltage level in the DC voltage link circuit is higher than the voltage level of the energy reservoir cells to be charged. In a charging phase, all coupling units that are associated with energy reservoir cells to be charged are controlled in such a way that the respectively associated energy reservoir cells are switched into the energy supply branch. All coupling units that are located in the energy supply branch of energy reservoir cells to be charged, but are not themselves associated with any energy reservoir cells to be charged, are controlled in such a way that the respectively associated energy reservoir cells are bypassed. All remaining coupling units are controlled in such a way that the respective energy supply branches are interrupted. In addition, at least one controllable high-side switch of the controllable bidirectional rectifier unit, which switch is disposed in a rectifier branch that is connected to an energy supply branch of the controllable energy reservoir which has no energy reservoir cells to be charged, is closed. In a free-wheeling phase following the charging phase, all coupling units that are associated with energy reservoir cells to be charged are controlled in such a way that the respectively associated energy reservoir cells are switched into the energy supply branch. All coupling units that are located in the energy supply branch of energy reservoir cells to be charged, but are not themselves associated with any energy reservoir cells to be charged, are controlled in such a way that the respectively associated energy reservoir cells are bypassed. All remaining coupling units are controlled in such a way that the respective energy supply branches are interrupted, and the controllable high-side switches of the controllable bidirectional rectifier unit are opened.

If the electrical machine can be decoupled or disconnected from the controllable energy reservoir, then any controllable high-side switch of the controllable bidirectional rectifier unit can also be closed during the charging phase.

In accordance with the present invention, an example method is provided for operating an example charging system according to the present invention in which a charging device is connected to the DC voltage link circuit, for the case in which a voltage level in the DC voltage link circuit is lower than the voltage level of the energy reservoir cells to be charged. In a charging phase, all coupling units that are located in the energy supply branch of energy reservoir cells to be charged are controlled in such a way that the respectively associated energy reservoir cells are bypassed. All remaining coupling units are controlled in such a way that the respective energy supply branches are interrupted. In addition, at least one controllable high-side switch of the controllable bidirectional rectifier unit, which switch is disposed in a rectifier branch that is connected to an energy supply branch of the controllable energy reservoir which has no energy reservoir cells to be charged, is closed. In a free-wheeling phase following the charging phase, all coupling units that are associated with energy reservoir cells to be charged are controlled in such a way that the respectively associated energy reservoir cells are switched into the energy supply branch. All coupling units that are located in the energy supply branch of energy reservoir cells to be charged, but are not themselves associated with any energy reservoir cells to be charged, are controlled in such a way that the respectively associated energy reservoir cells are bypassed. All remaining coupling units are controlled in such a way that the respective energy supply branches are interrupted, and the controllable high-side switches of the controllable bidirectional rectifier unit are closed.

If the electrical machine can be decoupled or disconnected from the controllable energy reservoir, then with this method as well any controllable high-side switch of the controllable bidirectional rectifier unit can also be closed during the charging phase.

In accordance with the present invention, the rectifier unit is embodied to be controllable and bidirectional, and co-utilized, together with the coupling units on the one hand and the stator windings of the electrical machine on the other hand, for a charging function. For the case in which, after connection of a charging device to the DC link circuit, a voltage level in the DC link circuit is higher than the voltage level of the energy reservoir cells to be charged, a requisite step-down function is implemented by the fact that high-side switches of a rectifier unit configured as a bridge rectifier, and the stator windings, are operated during a charging operation analogously to a step-down converter. In a charging phase, energy is conveyed to the stator windings and stored there, and in a free-wheeling phase is then delivered to the energy reservoir cells to be charged. The requisite step-down ratio is established by correspondingly pulse-shaped, in particular pulse width modulated, application of control to at least one high-side switch of the rectifier unit. For the case in which, after connection of a charging device to the DC link circuit, a voltage level in the DC link circuit is lower than the voltage level of the energy reservoir cells to be charged, a requisite step-up function can be implemented by the fact that the coupling units that are associated with energy reservoir cells to be charged, and the stator windings, are operated analogously to a step-up converter; energy is conveyed to the stator windings and stored there, and in a free-wheeling phase is then delivered to the energy reservoir cells to be charged. The requisite step-up ratio is established by correspondingly pulse-shaped, in particular pulse width modulated, application of control to the coupling units that are associated with the energy reservoir cells to be charged.

Only minimal additional hardware outlay results in each case, which is consistent with low cost and little space requirement. In addition, a further energy reservoir present in the DC link circuit can optionally also be charged with a system according to the present invention.

The example system and methods according to the present invention make possible both charging of energy reservoir cells in an individual energy reservoir module, and simultaneous charging of energy reservoir cells of multiple energy reservoir modules. In the case of a multi-phase electrical machine, the energy reservoir cells of energy reservoir modules that are located in different energy supply branches can also be charged simultaneously. Consideration should be given, however, to the fact that during operation of the electrical machine, only the energy reservoir cells in n−1 energy supply branches can be charged simultaneously. By decoupling the electrical machine and providing additional charging inductances, however, energy reservoir cells in all energy supply branches can also be charged simultaneously. If the energy reservoir cells of multiple modules are to be charged simultaneously, it is advantageous if the energy reservoir modules are symmetrized in high-impedance fashion, so that equivalent voltage drops occur at the individual energy reservoir modules. Alternatively, however, the coupling units can also be designed for correspondingly high inhibition capabilities.

The task of the charging device is merely to make a suitable DC voltage available. The charging device can in that regard be implemented in a variety of ways. It can be configured, for example, as a single- or multi-phase line-connected charging unit, or also as a DC voltage charging station.

Undesired torques in the electrical machine during the charging operation can be avoided by mechanically blocking the electrical machine during the charging operation, for example with the aid of a linkage detent pawl. Alternatively, the rotor position of the electrical machine can also be monitored, for example with the aid of a corresponding sensor suite, and shut off in the event a rotor motion is detected.

If the inductances of the stator windings of the electrical machine are insufficient, an additional charging inductance is then insertable between the charging device and the electrical machine or between the charging device and the controllable energy reservoir.

According to an example embodiment of the present invention, an isolating unit is provided with which the electrical machine can be isolated from the controllable energy reservoir during a charging operation. The additional charging inductances can in that way also be used, independently of the stator windings, to implement the requisite step-up or step-down function, creating the possibility of also charging energy reservoir cells in all energy supply branches simultaneously.

Further features and advantages of example embodiments of the present invention are evident from the description below with reference to the figures.

DETAILED DESCRIPTION OF EXAMPLE EMBODIMENTS

Figure 1:
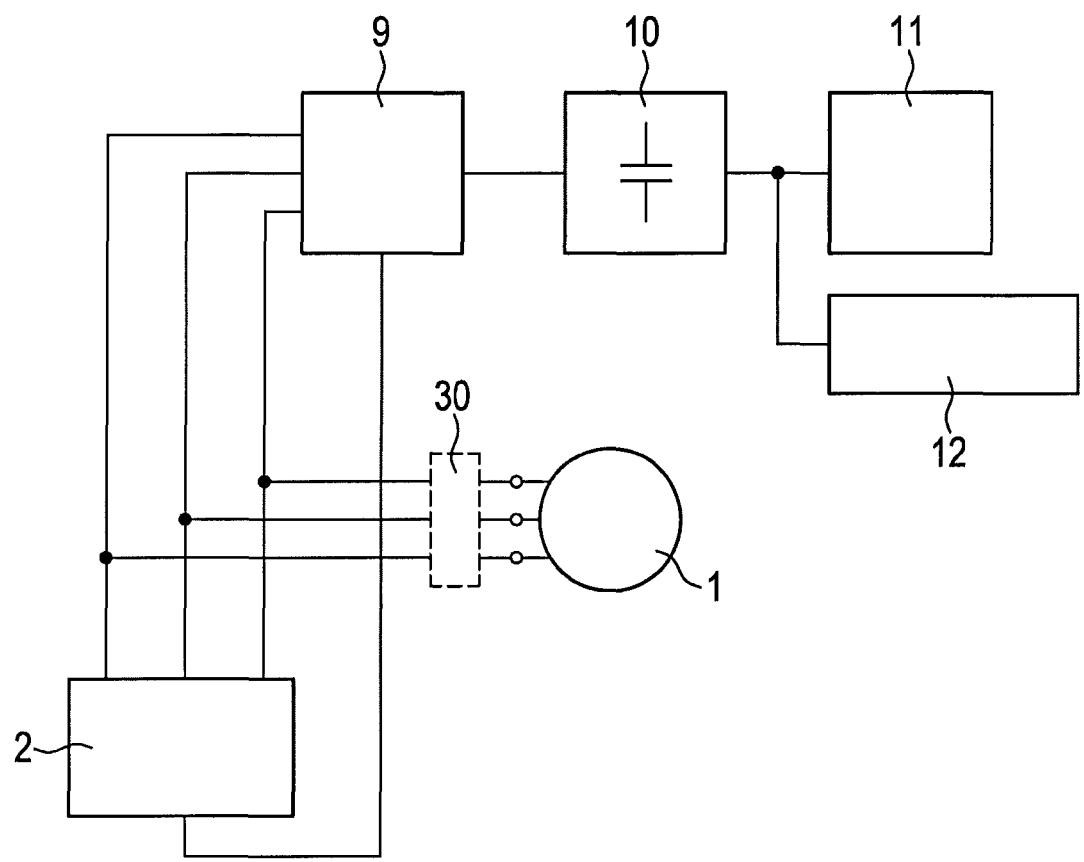
FIG. 1 is a schematic block diagram of an energy supply network having a charging system according to an example embodiment of the present invention.

FIG. 1 is a schematic block diagram of an energy supply network having a charging system according to an example embodiment of the present invention. A controllable energy reservoir 2 is connected to a three-phase electrical machine 1. Controllable energy reservoir 2 encompasses three energy supply branches 3-1, 3-2, and 3-3, which are connected on the one hand to a reference potential T− (reference bus) that, in the embodiment depicted, carries a low potential, and on the other hand respectively to individual phases U, V, W of electrical machine 1 (see FIGS. 2, 3, 4). Each of energy supply branches 3-1, 3-2, and 3-3 has, connected in series, m energy reservoir modules 4-11 to 4-1m, 4-21 to 4-2m, and 4-31 to 4-3m respectively, where m≥2. Energy reservoir modules 4 in turn each encompass multiple electrical energy reservoir cells connected in series which, for reasons of clarity, are labeled in FIGS. 2, 3, and 4 only in energy supply branch 3-3 connected to phase W of electrical machine 1, with reference characters 5-31 to 5-3m. Energy reservoir modules 4 furthermore each encompass a coupling unit that is associated with energy reservoir cells 5 of the respective energy reservoir module 4. For reasons of clarity, the coupling units too are labeled only in energy supply branch 3-3, with reference characters 6-31 to 6-3m. In the variant embodiment depicted in FIGS. 2, 3, and 4, coupling units 6 are each constituted by two controllable switch elements 7-311 and 7-312 to 7-3m1 and 7-3m2. The switch elements can be embodied as power semiconductor switches, e.g. in the form of insulated gate bipolar transistors (IGBTs) or as metal oxide semiconductor field-effect transistors (MOSFETs).

Coupling units 6 make it possible to interrupt the respective energy supply branch 3 by opening both switch elements 7 of a coupling unit 6. Alternatively, energy reservoir cells 5 either can be bypassed by closing one of the respective switch elements 7 of a coupling unit 6, for example by closing switch 7-311, or can be switched into the respective energy supply branch 3, for example by closing switch 7-312.

The total output voltages of energy supply branches 3-1 to 3-3 are determined by the respective switching state of the controllable switch elements 7 of coupling units 6, and can be adjusted in steps. The steps occur as a function of the voltage of the individual energy reservoir modules 4. Proceeding from the preferred embodiment of identically configured energy reservoir modules 4, what results then as a maximum possible total output voltage is the voltage of an individual energy reservoir module 4 times the number m of energy reservoir modules 4 connected in series in each energy supply branch 3.

Coupling units 6 thus make it possible to switch phases U, V, W of electrical machine 1 toward either a high reference potential or a low reference potential, and can in that regard also perform the function of a conventional inverter. The power output and operating mode of electrical machine 1 can thus be controlled, with appropriate application of control to coupling units 6, by controllable energy reservoir 2. Controllable energy reservoir 2 thus performs a dual function in this regard, since it serves not only to supply electrical energy to electrical machine 1 but also to control it.

Electrical machine 1 has stator windings 8-U, 8-V and 8-W that, in the exemplifying embodiment depicted, are interconnected with one another in a star configuration.

In the exemplifying embodiment depicted, electrical machine 1 is embodied as a three-phase rotary current machine, but it can also have fewer or more than three phases. The number of phases of the electrical machine of course also governs the number of energy supply branches 3 in controllable energy reservoir 2.

In the exemplifying embodiment depicted, each energy reservoir module 4 has multiple respective energy reservoir cells 5 connected in series. Energy reservoir modules 4 can, however, alternatively also have only a single energy reservoir cell or also energy reservoir cells connected in parallel.

In the exemplifying embodiment depicted, coupling units 6 are each constituted by two controllable switch elements 7. Coupling units 6 can, however, also be realized using more or fewer controllable switch elements, provided the requisite functions (interruption of the energy supply branch, bypassing of the energy reservoir cells, and switching of the energy supply cells into the energy supply branch) can be realized. Examples of alternative embodiments of a coupling unit are evident from German Patent Application Nos. DE 10 2010 027857 and DE 10 2010 027861. It is moreover also conceivable, however, for the coupling elements to have switch elements in a full bridge configuration, which offers the additional capability of a voltage reversal at the output of the energy reservoir module.

During motor-mode operation of electrical machine 1, controllable first energy reservoir 2 furnishes at the output side an alternating voltage for applying control to electrical machine 1. In contrast to conventional systems, however, in which an electrical machine is controlled via an inverter and is supplied with electrical energy by an electrical energy reservoir separate therefrom, no DC voltage is available for supplying energy directly to electrical loads such as, for example, high-voltage loads in a vehicle electrical system, or as an input variable for a DC voltage converter.

A rectifier unit 9 having a number of phases adapted to the number of phases of electrical machine 1, i.e., in the present exemplifying embodiment having three phases, is therefore provided, which unit is connected on the input side to energy supply branches 3 of controllable energy reservoir 2 and to the respectively associated phases U, V, W of the electrical machine, and on the output side is connected to a DC voltage link circuit 10. DC voltage link circuit 10 is constituted substantially by a link circuit capacitor (not depicted separately). Downstream from DC link circuit 10 is a second energy reservoir 11 from which electrical loads (not depicted) can be supplied with DC voltage. Depending on the application, a DC voltage converter can also be located upstream or downstream from the link circuit capacitor.

A charging device 12 is connectable to DC link circuit 10 in order to enable charging of energy reservoir cells 5 of one or more energy reservoir modules 4. Charging device 12 makes energy available to energy reservoir cells 5 for charging, and can be configured, for example, as a single- or multi-phase line-connected charging unit, or also as a DC voltage charging station.

If the phase currents of electrical machine 1 are to be measured in order to regulate electrical machine 1, care must be taken that current measurement occurs only after the tapping point of charging unit 11. This is indicated in FIG. 1 by a block having the reference character 30.

Figure 2:
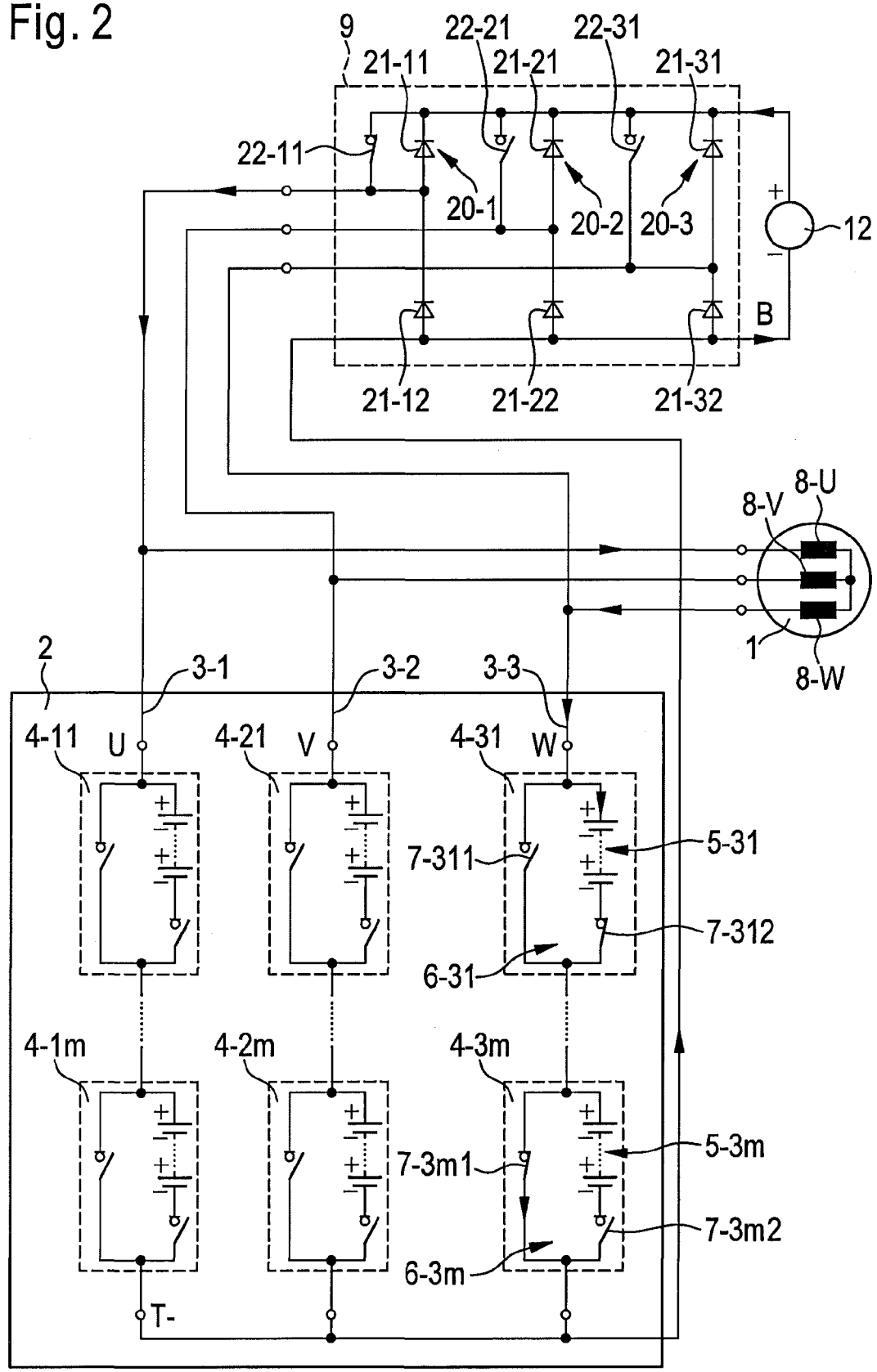
FIG. 2 schematically depicts a charging system according to an example embodiment of the present invention in a charging phase, when a voltage level in the DC voltage link circuit is higher than a voltage level of the energy reservoir cells to be charged.
Figure 3:
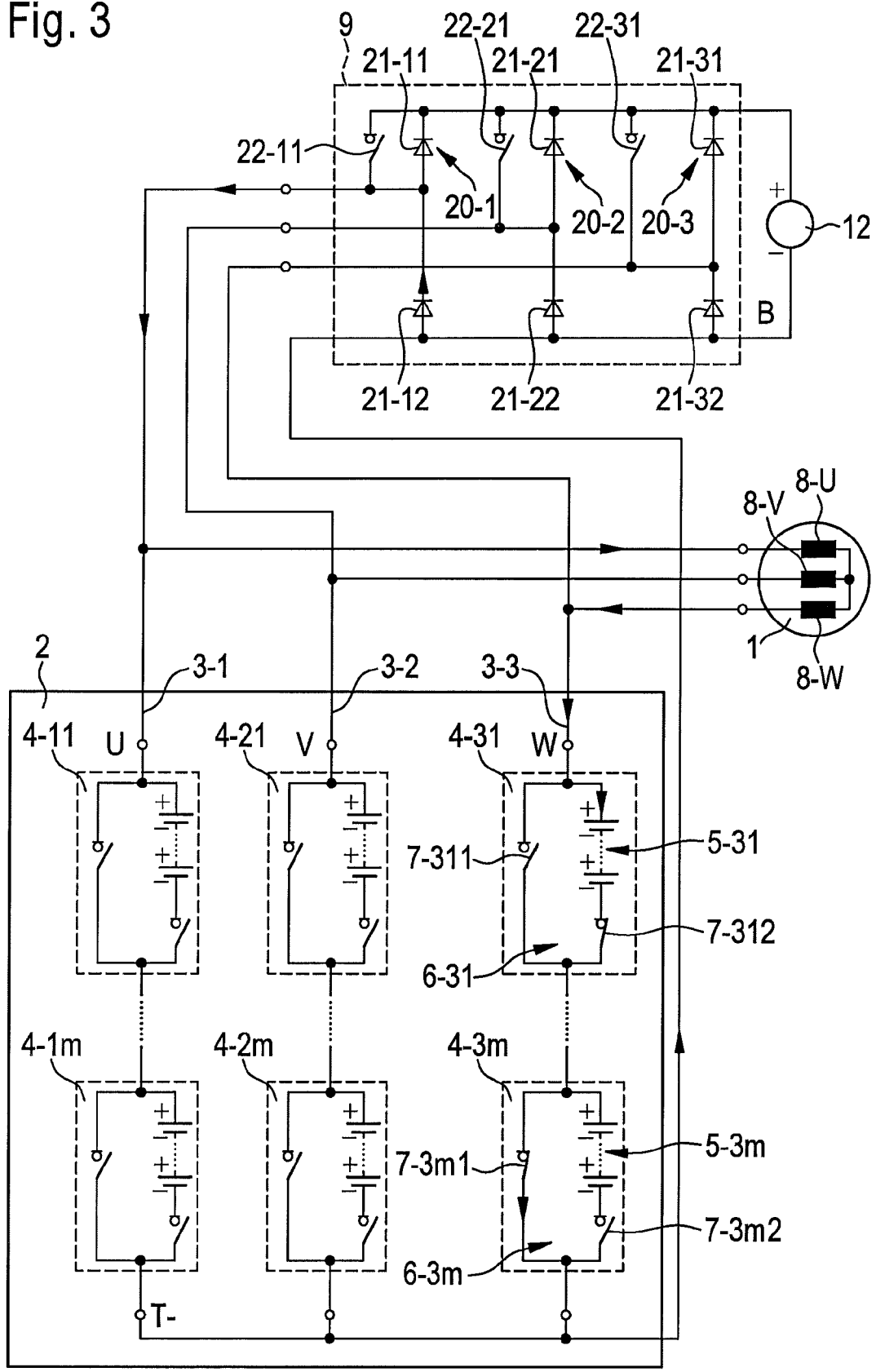
FIG. 3 shows the charging system according to FIG. 2 in a free-wheeling phase.
Figure 4:
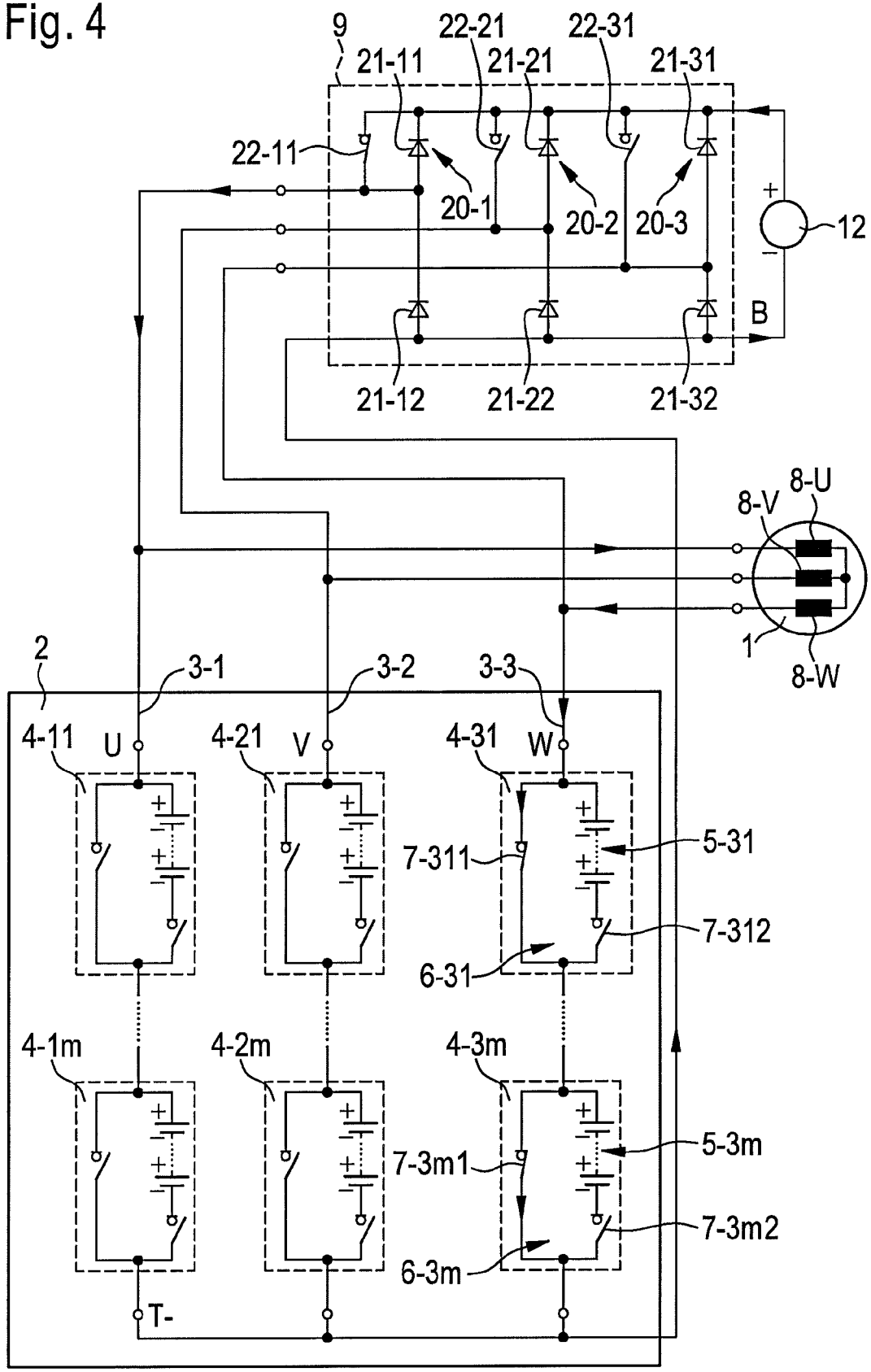
FIG. 4 schematically depicts a charging system according to an example embodiment of the the present invention in a charging phase, when a voltage level in the DC voltage link circuit is lower than a voltage level of the energy reservoir cells to be charged.

FIGS. 2 to 4 schematically show a charging system according to an example embodiment of the present invention. The three-phase rectifier unit 9 encompasses three parallel rectifier branches 20-1, 20-2, and 20-3 that are each connected to a respective energy supply branch 3-1, 3-2, and 3-3 of controllable energy reservoir 2 and to the respectively associated phase U, V, and W of electrical machine 1. Rectifier unit 9 is embodied as a diode rectifier in bridge configuration. Respective controllable switch elements 22-11, 22-21, 22-31 (high-side switches) are inserted parallel to those diodes 21-11, 21-21, and 21-31 (high-side diodes) which are connected to a high potential. Diodes 21-12, 21-22, and 21-32 that are connected to a low potential of a reference bus B of DC link circuit 10 (low-side diodes) are embodied in this exemplifying embodiment without controllable switch elements inserted in parallel. Corresponding low-side switches can, however, also be provided. It is also conceivable to replace diodes 21 entirely with controllable switch elements 22.

Charging device 12 is depicted, in simplified fashion in the form of an equivalent circuit diagram, as a DC voltage source that is attached directly to rectifier unit 9. A positive pole of charging device 12 is connected to a voltage bus of rectifier unit 9 carrying a high potential, and the negative pole of the charging device is connected to reference bus B of DC link circuit 10. Reference bus B of DC link circuit 10 is moreover connected to reference bus T– of controllable energy reservoir 2, thereby forming an external return lead.

The operation of charging energy reservoir cells 5 of a single energy reservoir module 4, namely energy reservoir cells 5-31 of energy reservoir module 4-31 in energy supply branch 3-3, will be described by way of example below.

Let it be assumed firstly that a voltage level in DC link circuit 10 is higher than the voltage level of energy reservoir cells 5-31 to be charged. During a charging phase that is depicted in FIG. 2, coupling unit 6-31 that is associated with energy reservoir cells 5-31 to be charged is controlled by a control unit (not depicted) in such a way that it is switched into energy supply branch 3-3. This is achieved concretely by the fact that switch element 7-311 is opened, whereas switch element 7-312 is closed. All remaining coupling units 6-32 to 6-3$m$ that are located in energy supply branch 3-3 in which energy reservoir cells 5-31 to be charged are also located are controlled by the control unit (not depicted) in such a way that the respectively associated energy reservoir cells 5-32 to 5-3$m$ are bypassed. This is achieved concretely by the fact that switch elements 7-321 to 7-3$m$1 are closed, whereas switch elements 7-322 to 7-3$m$2 are opened. All remaining coupling units 6, i.e., all coupling units 6 in energy reservoir modules 4 of the other two energy supply branches 3-1 and 3-2, are controlled in such a way that the respective energy supply branches 3-1 and 3-2 are interrupted. Concretely, this is achieved by the fact that both respective switch elements of coupling units 6 are opened. High-side switch 22-11 is closed.

Application of control in this fashion to coupling units 6 and to high-side switch 22-11 produces a current flow through stator windings 8-U and 8-W, so that electrical energy is stored in stator windings 8-U and 8-W during the charging phase. This current flow is characterized in FIG. 2 by corresponding arrows.

In a free-wheeling phase that follows the charging phase and is depicted in FIG. 3, coupling unit 6-31 that is associated with energy reservoir cells 5-31 to be charged continues to be controlled in such a way that the associated energy reservoir cells 5-31 are switched into energy supply branch 3-3. All remaining coupling units 6-32 to 6-3$m$ that are located in energy supply branch 3-3 of energy reservoir cells 5-31 to be charged, but are not themselves associated with any energy reservoir cells to be charged, continue to be controlled in such a way that the respectively associated energy reservoir cells are bypassed. Coupling units 6-11 to 6-1$m$ and 6-21 to 6-2$m$ in the remaining energy supply branches 3-1 and 3-2 continue to be controlled in such a way that the respective energy supply branches 3-1 and 3-2 are interrupted. High-side switches 22-11, 22-21, and 22-31 of the rectifier unit are opened during the free-wheeling phase.

Application of control in this fashion to coupling units 6 and to high-side switches 22 of rectifier unit 12 produces a closed circuit between stator windings 8-U, 8-W and energy reservoir cells 5-31 to be charged. The inductance of stator windings 8 continues to drive the current and thereby charges energy reservoir cells 5-31. The corresponding current flow is once again characterized in FIG. 3 by corresponding arrows.

The step-down ratio necessary for charging energy reservoir cells 5-31 is established by pulse-shaped application of control to high-side switch 22-11.

Let it be assumed now that a voltage level in DC link circuit 10 is lower than the voltage level of energy reservoir cells 5-31 to be charged. In this case, during a charging phase that is depicted in FIG. 4, all coupling units 6-31 to 6-3$m$ that are located in energy supply branch 3-3 of energy reservoir cells 5-31 to be charged are controlled in such a way that the respectively associated energy reservoir cells 5-32 to 5-3$m$ are bypassed. All other coupling units 6, i.e., all coupling units 6 in energy reservoir modules 4 of the other two energy supply branches 3-1 and 3-2, are interrupted. At least one high-side switch 22 of rectifier unit 12, which is located in a rectifier branch that is connected to an energy supply branch 3 of controllable energy reservoir 2 which does not have any energy reservoir cells 5 to be charged, is closed during the charging phase. By way of example, in FIG. 4 high-side switch 22-11 is closed.

Application of control in this manner to coupling units 6 and to high-side switches 22 produces a current flow through stator windings 8-U and 8-W, so that electrical energy is stored in stator windings 8-U and 8-W during the charging phase. This current flow is characterized in FIG. 4 by corresponding arrows.

During a free-wheeling phase that follows the charging phase, coupling units 6 and switch elements 22 of the rectifier unit are controlled largely by analogy with the situation, explained with reference to FIG. 3, with a voltage level in DC voltage link circuit 10 that is above the voltage level of energy reservoir cells 5-31 to be charged. The only difference with respect to the free-wheeling phase depicted in FIG. 3 is that this time high-side switch 22-11 remains closed in the free-wheeling phase as well. With regard to control of the remaining switch elements 22 and of coupling units 6 during the free-wheeling phase, reference is made to the corresponding statements about FIG. 3 in order to avoid repetition.

The step-up ratio necessary for charging energy reservoir cells 5-31 is established in this case by pulse-shaped application of control to coupling unit 6-31 that is associated with the energy reservoir cells to be charged.

Figure 5:
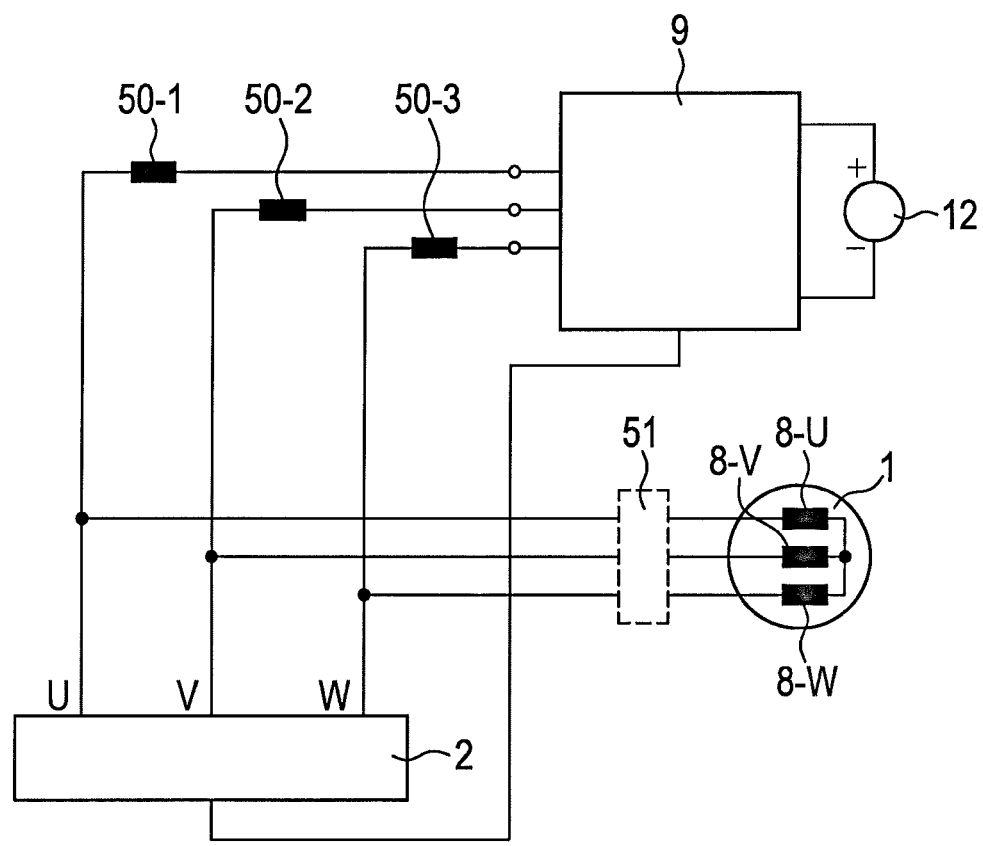
FIG. 5 schematically depicts a charging system according to an example embodiment of the present invention having additional charging inductances and an isolating unit.

If the motor inductances are not sufficient, additional external charging inductances 50-1, 50-2, and 50-3 can be used, these being inserted between rectifier unit 12 and respectively electrical machine 1 and controllable energy reservoir 2 (FIG. 5). If an isolating unit 51, with which electrical machine 1 can be isolated from controllable energy reservoir 2 during a charging operation, is additionally present, charging inductances 50-1, 50-2, and 50-3 can then also be used independently of stator windings 8-U, 8-V, and 8-W to charge energy reservoir cells 5. This then also makes possible simultaneous charging of energy reservoir cells 5 in all the energy supply branches 3-1, 3-2, and 3-3.

The additional charging inductances 50-1, 50-2, and 50-3, as well as isolating unit 51, also make it possible, in the context of the charging methods explained with reference to FIGS. 2 to 4, for any controllable high-side switch of the controllable bidirectional rectifier unit to be closed in the charging phase.

Undesired torques during the charging operation can be avoided by mechanically blocking electrical machine 1 during the charging operation, for example with the aid of a linkage detent pawl. Alternatively, the rotor position of electrical machine 1 can also be monitored, for example with the aid of a corresponding sensor suite, and shut off in the event a rotor motion is detected.

Figure 6:
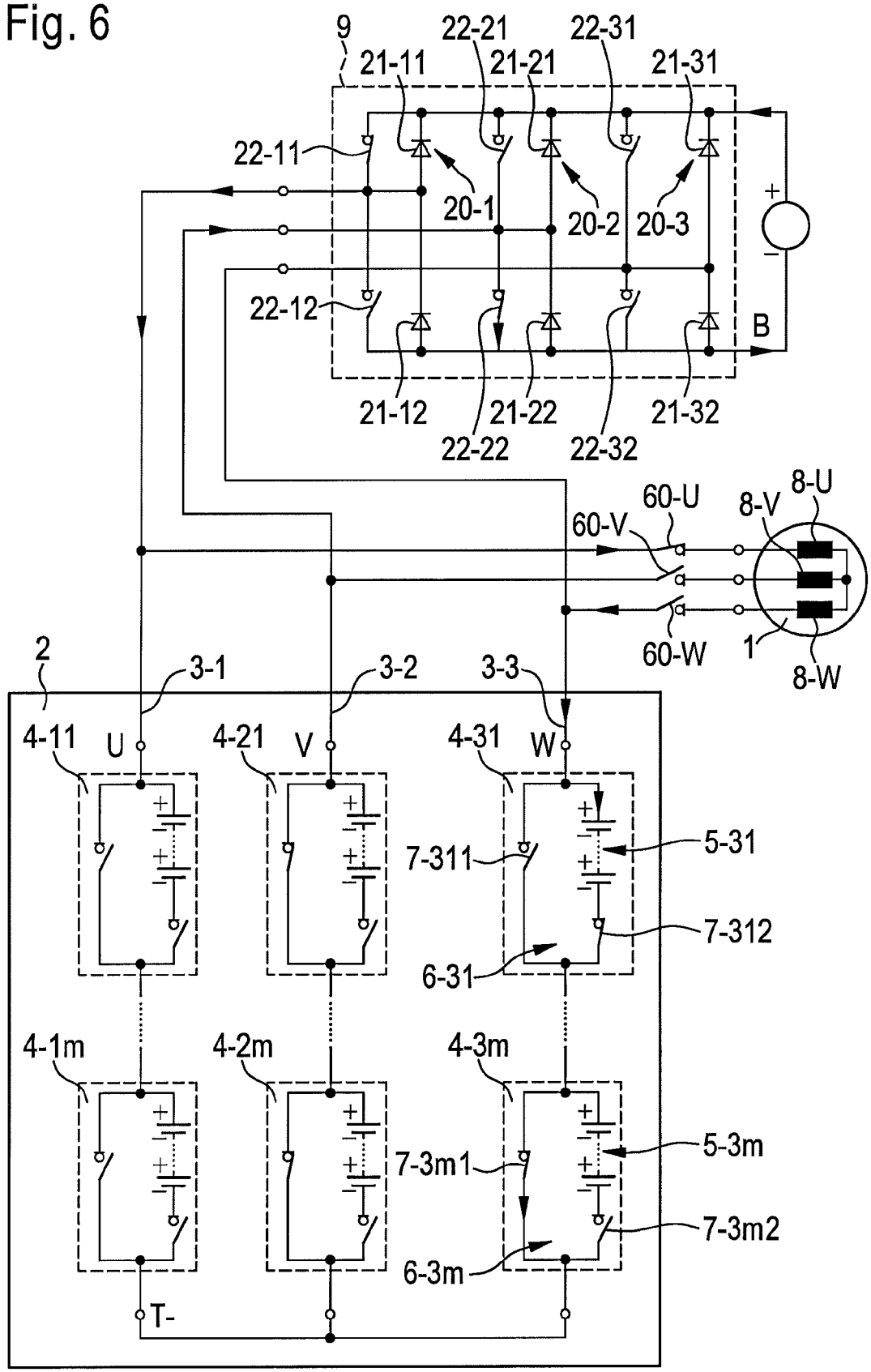
FIG. 6 schematically depicts a charging system having no external return lead.

Also possible is a charging system, and a method for operating it, that does without an external return lead, i.e., without an electrical connection between reference bus T− of controllable energy reservoir 2 and reference bus B of DC voltage link circuit 10. In this case a return flux branch for the current flux during the charging operation is constituted by an energy supply branch 3 of controllable energy reservoir 2 which does not itself have any energy reservoir cells 5 to be charged. This means, however, that a respective additional controllable switch element 60-U, 60-V, 60-W that enables decoupling of the return flux branch from the respective stator windings 8-U, 8-V, 8-W must be provided in at least two of the connecting leads between controllable energy reservoir 2 and electrical machine 1. This is necessary because the star point of electrical machine 1 is otherwise pulled to ground, which would result in a short circuit. In addition, low-side switches 22-12, 22-22, and 22-32 must be provided in rectifier unit 12 at least in those rectifier branches 20 which are connected to those connecting leads which have the additional switch elements. FIG. 6 depicts a charging phase for a charging system of this kind. The free-wheeling phase proceeds analogously to what was stated regarding FIG. 3.

What is claimed is:

1. A system for charging at least one energy reservoir cell in a controllable energy reservoir which serves to control and supply electrical energy to an n-phase electrical machine, where n≥1, comprising:
    n parallel energy supply branches that each have at least two energy reservoir modules connected in series that each encompass at least one electrical energy reservoir cell having an associated controllable coupling unit, each of the energy supply branches being connectable on the one hand to a reference bus, and connectable on the other hand to a respective phase of the electrical machine;
    wherein the coupling units are configured to interrupt the respective energy supply branch or bypass the respectively associated energy reservoir cells or switch the respectively associated energy reservoir cells into the respective energy supply branch, as a function of control signals;
    wherein the energy supply branches of the controllable energy reservoir and the phases of the electrical machine are connectable via a controllable n-phase bidirectional rectifier unit to a DC voltage link circuit;
    wherein the reference bus of the controllable energy reservoir is connectable to a reference bus of the DC voltage link circuit; and
    wherein the DC link circuit is electrically connectable to a charging device.

2. The system as recited in claim 1, where the controllable bidirectional rectifier unit is configured as a bridge rectifier.

3. The system as recited in claim 2, wherein the rectifier unit encompasses n parallel rectifier branches that are each connectable to a respective energy supply branch and to the associated phase of the electrical machine and that each have at least one controllable high-side switch.

4. The system as recited in claim 3, wherein additional charging inductances are between the rectifier unit and the controllable energy reservoir.

5. The system as recited in claim 4, further comprising:
    an isolating unit by which the electrical machine may be isolated from the controllable energy reservoir during a charging operation.

6. A method for operating a charging system, the charging system including n parallel energy supply branches that each have at least two energy reservoir modules connected in series that each encompass at least one electrical energy reservoir cell having an associated controllable coupling unit, each of the energy supply branches being connectable on the one hand to a reference bus, and connectable on the other hand to a respective phase of the electrical machine, wherein the coupling units are configured to interrupt the respective energy supply branch or bypass the respectively associated energy reservoir cells or switch the respectively associated energy reservoir cells into the respective energy supply branch, as a function of control signals, wherein the energy supply branches of the controllable energy reservoir and the phases of the electrical machine are connectable via a controllable n-phase bidirectional rectifier unit to a DC voltage link circuit, wherein the reference bus of the controllable energy reservoir is connectable to a reference bus of the DC voltage link circuit, and wherein the DC link circuit is electrically connectable to a charging device, the method comprising:
    connecting a charging device to the DC voltage link circuit, a voltage level in the DC voltage link circuit being higher than the voltage level of energy reservoir cells to be charged;
    in a charging phase:
        controlling all coupling units that are associated with energy reservoir cells to be charged in such a way that the respectively associated energy reservoir cells are switched into the energy supply branch,
        controlling all coupling units that are located in the energy supply branch of energy reservoir cells to be charged, but are not themselves associated with any energy reservoir cells to be charged, in such a way that the respectively associated energy reservoir cells are bypassed,
        controlling all remaining coupling units in such a way that the respective energy supply branches are interrupted, and
        closing at least one controllable high-side switch of the controllable bidirectional rectifier unit, which switch is disposed in a rectifier branch that is connected to an energy supply branch of the controllable energy reservoir which has no energy reservoir cells to be charged; and
    in a free-wheeling phase following the charging phase:
        controlling all coupling units that are associated with energy reservoir cells to be charged in such a way that the respectively associated energy reservoir cells are switched into the energy supply branch,
        controlling all coupling units that are located in the energy supply branch of energy reservoir cells to be charged, but are not themselves associated with any energy reservoir cells to be charged, in such a way that the respectively associated energy reservoir cells are bypassed, controlling all remaining coupling units in such a way that the respective energy supply branches are interrupted, and opening the controllable high-side switches of the controllable bidirectional rectifier unit.

7. A method for operating a charging system, the charging system including n parallel energy supply branches that each have at least two energy reservoir modules, connected in series that each encompass at least one electrical energy reservoir cell having an associated controllable coupling unit, each of the energy supply branches being connectable on the one hand to a reference bus, and connectable on the other hand to a respective phase of the electrical machine, wherein the coupling units are configured to interrupt the respective energy supply branch or bypass the respectively associated energy reservoir cells or switch the respectively associated energy reservoir cells into the respective energy supply branch, as a function of control signals, wherein the energy supply branches of the controllable energy reservoir and the phases of the electrical machine are connectable via a controllable n-phase bidirectional rectifier unit to a DC voltage link circuit, wherein the reference bus of the controllable energy reservoir is connectable to a reference bus of the DC voltage link circuit, and wherein the DC link circuit is electrically connectable to a charging device, the method comprising:

connecting a charging device to the DC voltage link circuit, a voltage level in the DC voltage link circuit being higher than the voltage level of the energy reservoir cells to be charged;

in a charging phase:
controlling all coupling units that are associated with energy reservoir cells to be charged in such a way that the respectively associated energy reservoir cells are switched into the energy supply branch, controlling all coupling units that are located in the energy supply branch of energy reservoir cells to be charged, but are not themselves associated with any energy reservoir cells to be charged, in such a way that the respectively associated energy reservoir cells are bypassed, controlling all remaining coupling units in such a way that the respective energy supply branches are interrupted, and closing at least one controllable high-side switch of the controllable bidirectional rectifier unit; and in a free-wheeling phase following the charging phase:
controlling all coupling units that are associated with energy reservoir cells to be charged in such a way that the respectively associated energy reservoir cells are switched into the energy supply branch, controlling all coupling units that are located in the energy supply branch of energy reservoir cells to be charged, but are not themselves associated with any energy reservoir cells to be charged, in such a way that the respectively associated energy reservoir cells are bypassed, controlling all remaining coupling units in such a way that the respective energy supply branches are interrupted, and opening the controllable high-side switches of the controllable bidirectional rectifier unit.

8. A method for operating a charging system, the charging system including n parallel energy supply branches that each have at least two energy reservoir modules, connected in series that each encompass at least one electrical energy reservoir cell having an associated controllable coupling unit, each of the energy supply branches being connectable on the one hand to a reference bus, and connectable on the other hand to a respective phase of the electrical machine, wherein the coupling units are configured to interrupt the respective energy supply branch or bypass the respectively associated energy reservoir cells or switch the respectively associated energy reservoir cells into the respective energy supply branch, as a function of control signals, wherein the energy supply branches of the controllable energy reservoir and the phases of the electrical machine are connectable via a controllable n-phase bidirectional rectifier unit to a DC voltage link circuit, wherein the reference bus of the controllable energy reservoir is connectable to a reference bus of the DC voltage link circuit, and wherein the DC link circuit is electrically connectable to a charging device, the method comprising:

connecting a charging device to the DC voltage link circuit, a voltage level in the DC voltage link circuit being lower than the voltage level of the energy reservoir cells to be charged;

in a charging phase:
controlling all coupling units that are located in the energy supply branch of energy reservoir cells to be charged in such a way that the respectively associated energy reservoir cells are bypassed, controlling all remaining coupling units in such a way that the respective energy supply branches are interrupted, and closing at least one controllable high-side switch of the controllable bidirectional rectifier unit, which switch is disposed in a rectifier branch that is connected to an energy supply branch of the controllable energy reservoir which has no energy reservoir cells;

in a free-wheeling phase following the charging phase:
controlling all coupling units that are associated with energy reservoir cells to be charged in such a way that the respectively associated energy reservoir cells are switched into the energy supply branch, controlling all coupling units that are located in the energy supply branch of energy reservoir cells to be charged, but are not themselves associated with any energy reservoir cells to be charged, are controlled in such a way that the respectively associated energy reservoir cells are bypassed, controlling all remaining coupling units in such a way that the respective energy supply branches (3-1, 3-2) are interrupted, and closing the controllable high-side switches of the controllable bidirectional rectifier unit.

9. A method for operating a charging system, the charging system including n parallel energy supply branches that each have at least two energy reservoir modules connected in series that each encompass at least one electrical energy reservoir cell having an associated controllable coupling unit, each of the energy supply branches being connectable on the one hand to a reference bus, and connectable on the other hand to a respective phase of the electrical machine, wherein the coupling units are configured to interrupt the respective respective energy supply branch or bypass the respectively associated energy reservoir cells or switch the respectively associated energy reservoir cells into the respective energy supply branch, as a function of control signals, wherein the energy supply branches of the controllable energy reservoir and the phases of the electrical machine are connectable via a controllable n-phase bidirectional rectifier unit to a DC voltage link circuit, wherein the reference bus of the controllable energy reservoir is connectable to a reference bus of the DC voltage link circuit, and wherein the DC link circuit is electrically connectable to a charging device, the method comprising:

connecting a charging device to the DC voltage link circuit, a voltage level in the DC voltage link circuit being lower than the voltage level of the energy reservoir cells to be charged;

in a charging phase:
controlling all coupling units that are located in the energy supply branch of energy reservoir cells to be charged are controlled in such a way that the respectively associated energy reservoir cells are bypassed,
controlling all remaining coupling units in such a way that the respective energy supply branches are interrupted, and
closing at least one controllable high-side switch of the controllable bidirectional rectifier unit;

in a free-wheeling phase following the charging phase:
controlling all coupling units that are associated with energy reservoir cells to be charged in such a way that the respectively associated energy reservoir cells are switched into the energy supply branch,
controlling all coupling units that are located in the energy supply branch of energy reservoir cells to be charged, but are not themselves associated with any energy reservoir cells to be charged, are controlled in such a way that the respectively associated energy reservoir cells are bypassed,
controlling all remaining coupling units in such a way that the respective energy supply branches are interrupted, and
closing the controllable high-side switches of the controllable bidirectional rectifier unit are closed.

* * * * *